Figure 1:
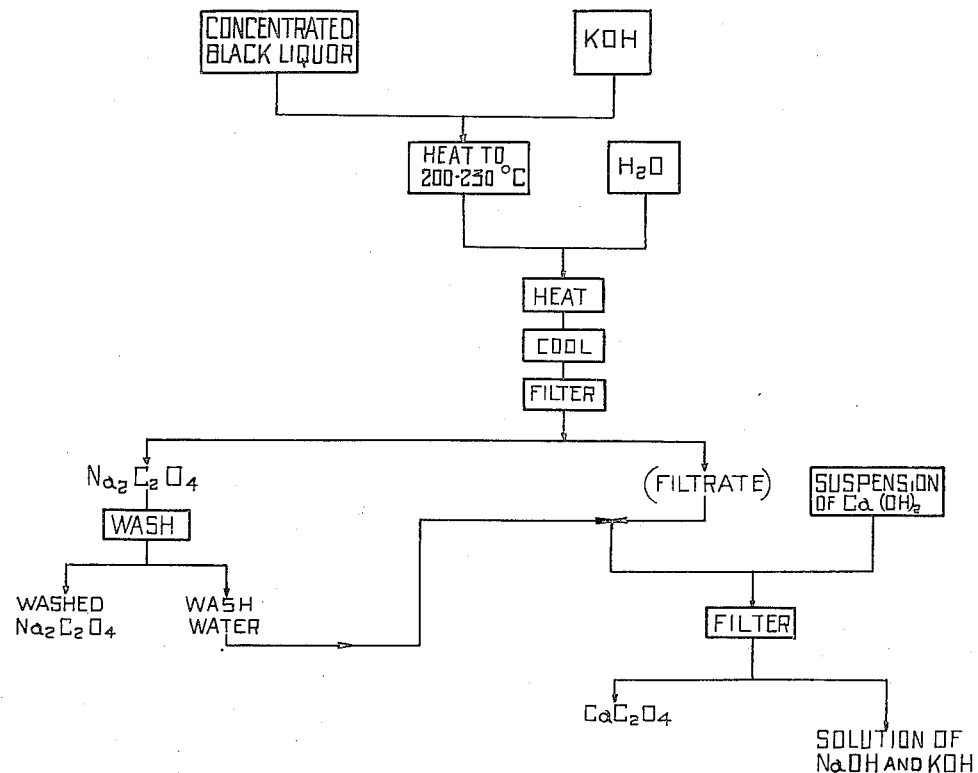

Dec. 8, 1936.   R. H. McKEE   2,063,177

RECOVERY OF ORGANIC CONSTITUENTS FROM BLACK LIQUOR

Filed Aug. 2, 1934

Inventor
RALPH H. McKEE
By C. L. Parker Jr.
Attorney

Patented Dec. 8, 1936

2,063,177

UNITED STATES PATENT OFFICE 2,063,177

RECOVERY OF ORGANIC CONSTITUENTS FROM BLACK LIQUOR

Ralph H. McKee, New York, N. Y.

Application August 2, 1934, Serial No. 738,155

18 Claims. (Cl. 260—119)

This invention relates to the recovery of organic constituents present in black liquor obtained in making paper pulp by the caustic soda process, and more particularly to a process of recovering oxalic and acetic acids from black liquor.

The principal object of this invention is to provide an improved process of recovering organic constituents present in black liquor in merchantable form.

An important object of the invention is to provide a process of recovering oxalic and acetic acids from black liquor and at the same time recovering the sodium compounds present in the black liquor in useful form.

Other objects and advantages of the invention will become apparent during the course of the following description.

According to the usual process of making paper pulp by the caustic soda method, wood chips, such as those from poplar, soft maple, birch, gum and similar woods, are heated in a digester with a solution of approximately 10% of caustic soda for some hours. Ordinarily this heating is carried out at a pressure of approximately 100 pounds per square inch, and at the corresponding temperature which is about 150° C. By this treatment the lignin present in the wood chips is dissolved and the cellulose fibers are left undissolved. These cellulose fibers are filtered off from the dark colored liquor which is commonly called "black liquor" in the industry and after being washed and bleached are ready for use in the manufacture of paper. In the kraft process the process is modified by having certain sulfur compounds present; of these sodium sulfide is dominant.

The black liquor contains, in addition to the organic constituents (lignin) removed from the wood chips, sodium salts. Several processes have been proposed for recovering these sodium salts. Ordinarily, the black liquor is evaporated to approximately 50% solids and then burned in a short rotary kiln known in the industry as a black ash furnace. The residue as it comes from the black ash furnace consists essentially of sodium carbonate mixed with unburned carbon and a small amount of sodium silicate and other impurities. It is then leached with hot water. This hot solution of sodium carbonate carrying a small amount of sodium silicate is then causticized with lime and the resulting caustic soda solution filtered off and reused in the process. This caustic soda solution will contain about 10% of unchanged sodium carbonate calculated on the dry basis. The losses in the recovery of the caustic soda are due largely to volatilization during the burning and are normally 10 to 15%, and this much additional caustic soda must be added to the caustic solution recovered either in the form of sodium hydroxide or sodium carbonate.

As will be noted, the organic constituents present in the black liquor are lost in this treatment for the recovery of the caustic soda. Several processes have been proposed for the recovery of the organic constituents from the black liquor but hitherto in the art there has been no practical process available for recovering the organic constituents present in or capable of being formed from the black liquor, in merchantable form, without at the same time having a loss of the sodium salts in useless form.

The present process overcomes the disadvantages of the prior art processes in that in the practice of the process oxalic acid and acetic acid are obtained from the black liquor and at the same time the caustic soda present in the liquor is recovered as caustic soda and the caustic potash added during the process is recovered as caustic potash.

In the present invention the new process of alkali recovery for a pulp mill has, among others, the advantage that there is less alkali loss in that there is no alkali volatilization up the stack since there is no burning step in the new process. The alkali lost by volatilization is ordinarily about half the total alkali loss.

In the practice of the present process the first steps of filtering off the cellulose fiber and evaporating the black liquor are the same as in the standard process. This concentrated black liquor contains from 50 to 60% by weight of solids calculated on the dry basis and about 40% of water.

The concentrated black liquor is mixed with crude caustic potash solid or solution and the mass is heated at a temperature of approximately 200 to 230° C. During this treatment the mass is stirred or otherwise exposed to the oxygen of the air. As hereinafter pointed out, the preferred method of accomplishing this result is to deliver a mixture of concentrated black liquor and caustic potash on to a moving heated surface to produce a substantially dry fused mass. My preference for such a surface is the surface of a heated drum. Considerable quantities of the alkali salts of oxalic acid and acetic acid are produced from the organic material present in the original black liquor during this heating treatment. The yield of oxalic acid ($H_2C_2O_4 \cdot 2H_2O$) calculated on the organic material present in the original black liquor is approximately 85% by weight calculated on the weight of the organic material present in the black liquor.

The oxalic acid and acetic acid are, of course, present in the semi-solid melt produced by the heat treatment in the form of their alkali salts and it is necessary to recover their acids from the salts present with the simultaneous recovery of the alkalies in useful form. The present process depends upon the fact that sodium oxalate ($Na_2C_2O_4$) is only slightly soluble in cold water and still less soluble in an alkaline solution of potassium oxalate. This permits of the recovery of the sodium in the form of sodium oxalate quite completely.

According to a specific embodiment of the process, a flow sheet of which is shown in Figure 1 of the accompanying drawing, 1000 parts by weight of the concentrated black liquor are mixed with from 900 to 1000 parts of crude caustic potash calculated as if on the dry basis. The mass is heated, water being at first evolved but later a nearly dry semi-fused but stiff mass remains. This is maintained at a temperature of approximately 200 to 230° C., preferably at about 230° C., for a short time, say five to ten minutes, the higher the temperature the shorter the time. During this heating the mass is stirred or treated in any suitable manner to permit contact with the air. To the resulting mass are added approximately 1000 parts by weight of water and the resulting mixture boiled up, and thereafter allowed to cool. Upon cooling, crystals of sodium oxalate ($Na_2C_2O_4$) precipitate and these crystals are filtered off. The crystals removed by filtration are washed with approximately 500 parts of water, preferably in portions. After drying they are ready for sale for certain industrial uses. Instead of boiling up the mixture and then allowing it to cool as described above, the mass may be lixiviated with cold or lukewarm water to remove the more soluble alkali compounds and leave the less soluble sodium oxalate, but the purity of the sodium oxalate produced is not so high as in the preferred process.

The filtrate and washings from the filtering off and washing of the sodium oxalate crystals are then treated with slightly more than the calculated amount of slaked lime which results in the formation of caustic soda and caustic potash and calcium oxalate with some calcium carbonate. The calcium oxalate ($CaC_2O_4$) which precipitates is filtered off. The filtrate is recovered and used as a caustic solution for pulp making. The precipitate of calcium oxalate is either sold directly as calcium oxalate or recovered in the form of oxalic acid by treatment with sulfuric acid and recrystallized by the methods customary in the art by which oxalic acid is made from calcium oxalate.

The preferred means for carrying out the heating of the mass to about 230° C. is an oil-heated slowly rotating cylinder drum in which the interior of the drum is filled with hot oil and the mass to be heated is carried on the outer surface of the drum. On completion of one circuit on the drum the reaction by which oxalates are formed has been completed and the mass is scraped off by a "doctor" and dropped on a conveyor which carries it to the dissolving tank. The reacting semi-fused mass is carried on the drum in a layer of one quarter of an inch or a little less in thickness. This permits ready access of air to the whole mass and gives the equivalent of stirring. The use of such apparatus to carry out the process has the additional advantage that it gives a needed temperature control. The reactions by which the oxalates are formed seem to be highly exothermic and as such the mass is likely with ordinary fusion pots, etc., to be overheated in spots and catch fire and burn. With the oil heated drum in case the temperature of any spot rises above the temperature of the metal drum surface then heat is absorbed by the drum from the thin layer of the reacting semi-fused mass and the temperature is kept below the kindling temperature and so does not catch fire.

From the foregoing it is apparent that substantially quantitative yields of oxalic acid are obtained by the practice of the process and that the caustic soda originally present is substantially completely recovered as such for further use in the pulp making process. Further, the caustic potash added in the process is recovered and is available for reuse in the process.

The process may be modified by a reduction of the amount of potassium hydroxide used but there results a corresponding reduction in yield of oxalates. When no potash is added but only sodium hydroxide is used the yield of oxalates falls to about twenty per cent. of that given by the preferred procedure.

Figure 2:
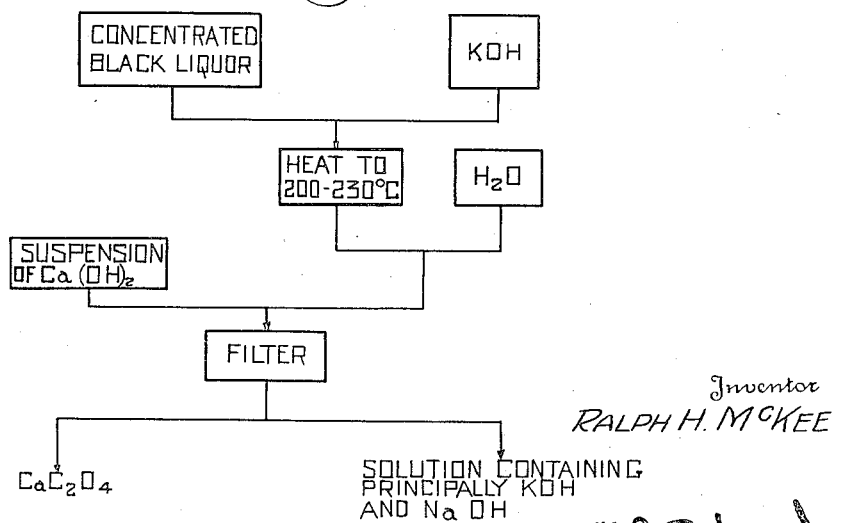

In the event that sodium oxalate is not wanted it may be found more economical to modify the preferred process as described above by dissolving the total original melt obtained by heating the evaporated black liquor with caustic alkali in water and treating the resulting solution with a suspension of calcium hydroxide, thereby precipitating all the oxalic acid present as calcium oxalate and leaving, after the removal of the calcium oxalate by filtration, a solution of caustic alkali and a small amount of alkali acetate in the filtrate. A flow sheet of such a procedure is shown in Figure 2 of the accompanying drawing. The caustic solution produced is somewhat colored by dissolved residual organic material, generally to the extent of about 3 per cent. as much color as the original black liquor. However, unlike that made by the processes commonly in use at the present time, this solution has the advantage that it is low in alkali carbonates due to the fact that in the solution before causticizing the major quantity of the alkali present was in the form of oxalate instead of carbonate.

In causticizing a mixture of the alkali salts of oxalic acid and carbonic acid it is, if desired, possible to precipitate the calcium oxalate largely free from calcium carbonate and the calcium carbonate substantially free from oxalate, i. e. the precipitation of the two salts is not simultaneous but is successive and moreover, contrary to what one would be led to expect from the respective solubilities of calcium oxalate and calcium carbonate in water, when milk of lime is added to a hot solution of the alkali carbonates and oxalates in an amount insufficient to precipitate both salts it is calcium carbonate that is precipitated. This can be filtered off and the filtrate treated with more milk of lime and calcium oxalate precipitated. By such a scheme the calcium oxalate precipitate will require less sulfuric acid for setting free the oxalic acid than when both calcium carbonate and calcium oxalate are present in large amounts in the precipitate.

In the event that only a portion of the alkali solution produced in the practice of the process is used for cooking another lot of wood chips in a digester, the portion not used for this purpose is preferably evaporated in an evaporator of the ordinary type to give a strong caustic alkali solution to be used again in the process for addition to the concentrated black liquor just before it is heated at a temperature of about 230° C., as described.

If substantially all of the alkali solution is used for cooking another lot of wood chips in the digester, the black liquor obtained will contain enough caustic potash so that the step of adding caustic potash to the concentrated black liquor before heating, as described, may advantageously be omitted in the further practice of the process. Thus, after the caustic potash has been introduced into the system further amounts need not be used in the further operation of the process except such small amounts as may have to be added from time to time to make up for mechanical losses. This saving in operation compensates for the loss of acetic acid which is not recovered in operating by this procedure.

In case all, rather than only a part, of the black liquor of a pulp mill is used for making oxalates and oxalic acid there will accumulate in the recovered caustic alkali considerable amounts of sodium and potassium acetates. Tests indicate that these are not undesirable constituents of the cooking liquor in that they act as buffers to reduce the caustic action of the alkalies, as does sodium sulfide in the kraft pulp process. This buffering action increases the pulp yield from a given weight of wood by about 5 per cent. and also makes a stronger pulp.

However, these accumulated acetate salts may be recovered and sold separately if desired by making use of the decreased solubility of calcium acetate in hot water as compared with cold water and its still lower solubility in the presence of alkalies. In other words, by proper choice of the amount of water present, the amount depending on the percentage of alkali metal acetates present, and by use of hot solutions, hot filtration and washing with small amounts of hot water, it is possible and practicable by use of milk of lime to precipitate the acetates as calcium acetate and simultaneously to recover the alkalies in the form of caustic soda and caustic potash. This recovery of the caustic alkalies from their acetates by causticizing with lime is new. The filtrate from the precipitated calcium acetate is ready, after dilution, to be used afresh in making pulp.

While it is old to make oxalic acid by heating forms of cellulose such as sawdust with a mixture of caustic potash and caustic soda, such prior processes do not possess the advantage of the present process. For example, the hours of heating required in an oxalic acid plant are many more than those indicated in applicant's process. Moreover, the yields in such prior processes have a maximum of approximately 50 per cent. of the organic material (sawdust) taken. In the present process the yields of oxalic acid run as high as 90 per cent of the weight of the organic material taken. All yields mentioned refer to weight on the dry basis but the oxalic acid is calculated as $H_2C_2O_4.2H_2O$, that is, with two molecules of water of crystalization.

It is to be understood that in the subjoined claims references as to weight of black liquor and caustic potash in each case refer to anhydrous materials, i. e. the weights of such materials are calculated on a dry basis.

While I have described in detail the preferred embodiment of my invention it is to be understood that the details of procedure may be widely varied without departing from the spirit of the invention or the scope of the subjoined claims.

I claim:

1. The process which comprises heating to a temperature not exceeding 230° C. a concentrated solution of lignin in caustic alkali with an approximately equal weight of caustic potash to produce a substantially dry mass, dissolving the resulting mass in water, treating the resulting solution containing alkali metal oxalates with calcium hydroxide, and separating the calcium oxalate formed from the solution.

2. The process which comprises heating a mixture of concentrated black liquor and caustic potash in approximately equal weights to a temperature of approximately 200 to 230° C. to produce a substantially dry fused mass, dissolving the resulting mass in water to produce a solution containing potassium oxalate, reacting the said potassium oxalate in solution with calcium hydroxide, and filtering off the calcium oxalate formed.

3. The process which comprises heating a mixture of concentrated black liquor and caustic potash in approximately equal weights to a temperature of approximately 200 to 230° C. to produce a substantially dry fused mass, dissolving the resulting mass in water to produce a solution containing alkali metal oxalates, treating said solution with a suspension of calcium hydroxide, and filtering off the calcium oxalate formed.

4. The process which comprises continuously delivering a mixture of approximately equal weights of concentrated black liquor and caustic potash on to a moving heated surface to produce a substantially dry fused mass, continuously removing said mass from said moving heated surface, dissolving the removed mass in water to produce a solution containing potassium oxalate, reacting said potassium oxalate in solution with calcium hydroxide, and separating the calcium oxalate formed from the solution.

5. The process which comprises continuously delivering a mixture of approximately equal weights of concentrated black liquor and caustic potash on to a moving heated surface to produce a substantially dry fused mass, continuously removing said mass from said moving heated surface, dissolving said mass in water to produce a solution containing alkali metal oxalates, heating said solution with calcium hydroxide, and separating the calcium oxalate formed from the solution.

6. The process which comprises heating a thin layer of a mixture of concentrated black liquor and caustic potash on a heated metal surface to produce a substantially dry fused mass, dissolving the total resulting mass in water to produce a solution of all of the soluble constituents of said mass, which solution contains potassium oxalate, reacting said potassium oxalate in solution with calcium hydroxide, and separating the calcium oxalate formed from the solution.

7. The process which comprises heating a thin layer of a mixture of concentrated black liquor and caustic potash on a heated metal surface to produce a substantially dry fused mass, dissolving the total resulting mass in water, to produce a solution of all of the soluble constituents of said mass, which solution contains alkali metal oxalates, treating said solution with a suspension of calcium hydroxide, and filtering off the calcium oxalate formed.

8. The process which comprises continuously delivering a thin layer of a mixture of concentrated black liquor and caustic potash in approximately equal weights on to a moving heated metal surface to produce a substantially dry fused mass, continuously removing said mass from said metal surface, dissolving said mass in water to produce a solution containing alkali-metal oxalates, treating such solution with a suspension of calcium hydroxide, and separating the calcium oxalate formed from the solution.

9. The process which comprises heating a concentrated solution of lignin in caustic alkali with caustic potash to produce a fused mass, dissolving the resulting mass in water, treating the resulting solution with calcium hydroxide to form calcium oxalate, separating the calcium oxalate formed from the solution, causticizing the remaining solution containing alkali metal acetates, caustic potash and caustic soda with calcium hydroxide and filtering off the calcium acetate formed while maintaining said liquor hot.

10. The process which comprises heating a mixture of concentrated black liquor and caustic potash in approximately equal weights to produce a substantially dry fused mass, dissolving the resulting mass in water, treating the resulting solution with a suspension of calcium hydroxide to form calcium oxalate, separating the calcium oxalate formed from the solution, causticizing with calcium hydroxide the remaining solution containing alkali metal acetates, caustic potash and caustic soda and filtering off the calcium acetate formed while maintaining said solution hot.

11. The process which comprises treating a caustic alkali solution containing an alkali metal acetate with calcium hydroxide and filtering off the calcium acetate formed while maintaining the said solution hot.

12. The process which comprises continuously delivering a concentrated solution of lignin in caustic alkali comprising caustic potash on to a moving heated surface to produce a substantially dry fused mass, continuously removing the mass from said moving heated surface, dissolving the resulting hot mass in water to produce a solution containing potassium oxalate, reacting said potassium oxalate in solution with calcium hydroxide, and recovering the calcium oxalate formed.

13. The process which comprises continuously delivering a concentrated solution of lignin in caustic alkali on to a moving heated surface to produce a substantially dry fused mass, continuously removing the mass from said moving heated surface, dissolving the resulting hot mass in water to produce a solution containing an alkali metal oxalate, treating said solution with calcium hydroxide, and separating the calcium oxalate formed from the solution.

14. The process which comprises continuously delivering a thin layer of a concentrated solution of lignin in caustic alkali on to a heated moving metal surface to produce a substantially dry fused mass, continuously removing said mass from said metal surface, dissolving the resulting hot mass in water to produce a solution containing alkali metal oxalates, treating such solution with a suspension of calcium hydroxide and separating the calcium oxalate formed from the solution.

15. The process which comprises heating a concentrated black liquor with caustic alkali comprising caustic potash to produce a substantially dry mass, dissolving the resulting mass in water, treating the resulting solution with calcium hydroxide to form calcium oxalate, separating the calcium oxalate formed from the solution, causticizing with calcium hydroxide the remaining solution containing alkali metal acetates, caustic potash and caustic soda and filtering off the calcium acetate formed while maintaining said solution hot.

16. The process which comprises continuously delivering a concentrated solution of lignin on to a moving heated surface to produce a substantially dry fused mass, dissolving the resulting mass in water, treating the resulting solution while hot with calcium hydroxide in an amount sufficient to react with the alkali metal carbonate present but in insufficient amount to react with the alkali metal oxalates present, filtering off the calcium carbonate formed, treating the filtrate with an additional amount of calcium hydroxide to precipitate calcium oxalate, and separating the calcium oxalate from the solution.

17. The process which comprises continuously delivering a mixture of concentrated black liquor and caustic potash on to a moving heated surface to produce thereon a substantially dry fused mass, continuously removing said mass from said moving heated surface, dissolving the mass in water, treating the resulting solution while hot with a suspension of calcium hydroxide in an amount sufficient to react with the alkali metal carbonate present but in an insufficient amount to react with the alkali metal oxalates present, filtering off the calcium carbonate formed, treating the filtrate with an additional amount of calcium hydroxide, and filtering off the calcium oxalate formed.

18. The process which comprises continuously delivering a thin layer of a mixture of concentrated black liquor and caustic potash on to a heated moving metal surface to produce thereon a substantially dry fused mass, continuously removing said mass from said metal surface, dissolving the resulting mass in water, treating the resulting solution while hot with a suspension of calcium hydroxide in an amount sufficient to react with the alkali metal carbonate present but in an insufficient amount to react with the alkali metal oxalates present, filtering off the precipitated calcium carbonate, adding to the filtrate an additional amount of a suspension of calcium hydroxide to precipitate calcium oxalate, and filtering off the calcium oxalate.

RALPH H. McKEE.